(12) United States Patent
Laforce et al.

(10) Patent No.: US 11,220,150 B2
(45) Date of Patent: Jan. 11, 2022

(54) ELECTRIC AXLE DRIVETRAIN ASSEMBLY

(71) Applicant: Dana Heavy Vehicle Systems Group, LLC, Maumee, OH (US)

(72) Inventors: Nicholas W. Laforce, Maumee, OH (US); Seth A. Metzger, Maumee, OH (US); Brian Thisse, Maumee, OH (US); Robert L. Vailliencourt, Maumee, OH (US); Steven J. Wesolowski, Maumee, OH (US); James F. Ziech, Maumee, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 19 days.

(21) Appl. No.: 16/642,868

(22) PCT Filed: Aug. 30, 2018

(86) PCT No.: PCT/US2018/048752
§ 371 (c)(1),
(2) Date: Feb. 27, 2020

(87) PCT Pub. No.: WO2019/046531
PCT Pub. Date: Mar. 7, 2019

(65) Prior Publication Data
US 2020/0346506 A1  Nov. 5, 2020

Related U.S. Application Data (60) Provisional application No. 62/551,835, filed on Aug. 30, 2017.

(51) Int. Cl.
*B60G 11/04* (2006.01)
*B60G 9/00* (2006.01)
*B60G 9/02* (2006.01)

(52) U.S. Cl.
CPC .............. *B60G 11/04* (2013.01); *B60G 9/003* (2013.01); *B60G 2200/31* (2013.01);
(Continued)

(58) Field of Classification Search
CPC .... B60G 11/04; B60G 9/003; B60G 2200/31; B60G 2202/112; B60G 2204/121;
(Continued)

(56) References Cited

U.S. PATENT DOCUMENTS

| | | |
|---|---|---|
| 3,896,895 A | 7/1975 | Schultz et al. |
| 3,952,824 A | 4/1976 | Matschinsky |

(Continued)

FOREIGN PATENT DOCUMENTS

| | | |
|---|---|---|
| DE | 3119810 A1 | 12/1982 |
| DE | 102011054580 A1 | 4/2013 |

(Continued)

OTHER PUBLICATIONS

ISA European Patent Office, International Search Report and Written Opinion Issued in Application No. PCT/US2018/048752, dated Dec. 13, 2018, WIPO, 18 pages.

*Primary Examiner* — Paul N Dickson
*Assistant Examiner* — Daniel M. Keck
(74) *Attorney, Agent, or Firm* — McCoy Russell LLP (57) ABSTRACT

An electric axle drivetrain assembly for use in a vehicle. The electric axle drivetrain assembly includes a motor that is drivingly connected to at least a portion of a differential assembly. Drivingly connected to ends of the differential assembly is a first axle half shaft and a second axle half shaft. At least a portion of a first and second wheel end assembly is connected to at least a portion of an end of the first and second axle half shafts opposite the differential assembly. A vehicle suspension system having a support member has a first hub carrier portion connected to a first (Continued)

end portion thereof and a second hub carrier portion connected to a second end portion thereof. Connected to at least a portion of a chassis is the motor and/or the differential assembly.

19 Claims, 8 Drawing Sheets

(52) U.S. Cl.
CPC .. *B60G 2202/112* (2013.01); *B60G 2204/121* (2013.01); *B60G 2300/50* (2013.01)

(58) Field of Classification Search
CPC ............ B60G 2300/50; B60G 2204/19; B60G 2204/18; B60G 2204/182; B60G 2200/32; B60G 2200/324; B60G 2300/026; B60G 9/02; B60G 9/027; B60G 11/113; B60G 2200/422; B60G 2200/341; B60G 2206/30; B60G 2200/30; B60K 1/00; B60K 2001/001; B60K 17/16; B60K 17/165; B60K 17/18; B60K 17/36
USPC ........... 180/59, 60, 61, 62, 63; 280/124.116, 280/124.156
See application file for complete search history.

(56) References Cited

U.S. PATENT DOCUMENTS

| | | | |
|---|---|---|---|
| 4,223,910 A | 9/1980 | Fry | |
| 4,433,744 A * | 2/1984 | Muhlbacher | B60K 1/00 180/312 |
| 4,669,571 A | 6/1987 | Kurde | |
| 5,188,195 A * | 2/1993 | Haustein | B60G 11/465 180/353 |
| 5,402,859 A | 4/1995 | Boberg et al. | |
| 5,715,901 A * | 2/1998 | Tokushima | F16H 1/06 180/65.6 |
| 7,980,350 B2 | 7/2011 | Oriet et al. | |
| 8,882,120 B2 * | 11/2014 | Juriga | B60G 17/0275 280/124.174 |
| 9,102,233 B2 | 8/2015 | Knoblauch et al. | |
| 9,242,556 B2 * | 1/2016 | Ziech | B60K 17/36 |
| 2005/0082105 A1 * | 4/2005 | Epple | B60G 3/145 180/361 |
| 2006/0022421 A1 * | 2/2006 | Dreher, Jr. | B60G 7/008 280/124.104 |
| 2009/0166106 A1 | 7/2009 | Batdorf | |
| 2013/0002072 A1 | 1/2013 | Phillips | |
| 2014/0262588 A1 | 9/2014 | Bruns et al. | |
| 2016/0046185 A1 * | 2/2016 | Morscheck | B60K 17/348 701/65 |
| 2020/0247224 A1 * | 8/2020 | Ito | B62D 21/03 |

FOREIGN PATENT DOCUMENTS

| | | | |
|---|---|---|---|
| EP | 2777973 A1 | 9/2014 | |
| GB | 1347109 A | 2/1974 | |
| GB | 2347398 A | 9/2000 | |
| GB | 2581134 A * | 8/2020 | ............ B60G 9/003 |
| WO | WO-2019003926 A1 * | 1/2019 | ............... B60G 9/04 |
| WO | WO-2019133957 A1 * | 7/2019 | ............ B60W 20/11 |

\* cited by examiner

ELECTRIC AXLE DRIVETRAIN ASSEMBLY

CROSS-REFERENCE TO RELATED APPLICATIONS

The present application is a U.S. National Phase of International Application No. PCT/US2018/048752, entitled "ELECTRIC AXLE DRIVETRAIN ASSEMBLY", filed on Aug. 30, 2018. International Application No. PCT/US2018/048752 claims the benefit to U.S. Provisional Patent Application No. 62/551,835, entitled "BATTERY ELECTRIC AXLE DRIVETRAIN", and filed on Aug. 30, 2017. The entire contents of each of the above-listed applications are hereby incorporated by reference for all purposes.

TECHNICAL FIELD

The present disclosure relates to an electric axle drivetrain assembly for use in a vehicle.

BACKGROUND AND SUMMARY

In recent years' considerable attention has been given to producing vehicles with increased fuel efficiency to reduce the overall fuel consumption of motorized vehicles all over the world. Additionally, in light of increasingly stringent emission controls, along with increasing fuel and oil costs, considerable attention has been given to producing vehicles that produce fewer emissions. As a result, considerable attention is being given to producing hybrid vehicles and all electric vehicles that have a reduced fuel consumption and produce fewer emissions.

Conventional electric axle drivetrain assemblies, compared to conventional internal combustion drivetrain assemblies, are known to increase the unsprung weight of a vehicle and decrease the overall amount of space available for various drivetrain components. For example, conventional electric axle drivetrains for vehicles, such as puck-up trucks, may require the motor of the drivetrain to be attached to an unsprung beam axle assembly which tends to result in a vehicle having poor ridding and handling characteristics.

It would therefore be advantageous to develop an electric axle drivetrain assembly that reduces the overall unsprung weight of the vehicle, is cost efficient and improves the overall packaging of the drivetrain. Additionally, it would be advantageous to develop an electric axle drivetrain assembly that is capable of being used in a commercial vehicle.

SUMMARY OF THE DISCLOSURE

An electric axle drivetrain assembly for use in a vehicle. The electric axle drivetrain assembly includes a motor that is drivingly connected to at least a portion of a differential assembly. Drivingly connected to an end of the differential assembly is a first axle half shaft and drivingly connected to an end of the differential assembly, opposite the first axle half shaft, is a second axle half shaft. At least a portion of a first and second wheel end assembly is connected to at least a portion of an end of the first and second axle half shafts opposite the differential assembly. A vehicle suspension system having a support member has a first hub carrier portion connected to a first end portion thereof and a second hub carrier portion connected to a second end portion thereof. Connected to at least a portion of a chassis is the motor and/or the differential assembly.

According to the previous aspect of the disclosure and as a non-limiting example, the electric axle drive train assembly may further include a first gear assembly drivingly connected to at least a portion of the motor. At least a portion of an end of the first gear assembly, opposite the motor, may me drivingly connected to at least a portion of the differential assembly.

According to any one of the previous aspects of the disclosure and as a non-limiting example, the electric axle drive train assembly may further include a first leaf spring assembly and a second leaf spring assembly. At least a portion of the first leaf spring assembly may be connected to at least a portion of a first hub carrier portion mounting flange and at least a portion of the second leaf spring assembly may be connected to at least a portion of a second hub carrier portion mounting flange.

According to any one of the previous aspects of the disclosure and as a non-limiting example, the first hub carrier portion may have a first hub carrier portion aperture and the second hub carrier portion may have a second hub carrier portion aperture. At least a portion of the first axle half shaft and/or the first wheel end assembly may extend through at least a portion of the first hub carrier portion aperture in the first hub carrier portion. Additionally, at least a portion of the second axle half shaft and/or the second wheel end assembly may extend through at least a portion of the second hub carrier portion aperture in the second hub carrier portion.

According to any one of the previous aspects of the disclosure and as a non-limiting example, the support member may further include a first radially inward extending portion in at least a portion of the first end portion of said support member and a second radially inward extending portion in at least a portion of the second end portion of the support member. At least a portion of a first leaf spring assembly may be connected to at least a portion of the first radially inward extending portion of the support member and at least a portion of a second leaf spring assembly may be connected to at least a portion of the second radially inward extending portion of the support member.

According to any one of the previous aspects of the disclosure and as a non-limiting example, the intermediate portion of the support member may include an axially outward extending portion having a size and shape to receive at least a portion of the differential assembly.

According to any one of the previous aspects of the disclosure and as a non-limiting example, the first gear assembly may further include a flange portion extending radially outboard from at least a portion of a housing of the first gear assembly. At least a portion of the flange portion is connected to at least a portion of the chassis.

According to any one of the previous aspects of the disclosure and as a non-limiting example, the electric axle drivetrain assembly may further include a clutch assembly. At least a portion of the clutch assembly may be connected to at least a portion of the motor and at least a portion of the differential assembly.

According to any one of the previous aspects of the disclosure and as a non-limiting example, the clutch assembly may be a friction clutch assembly, a wet clutch assembly or a dog clutch assembly.

According to any one of the previous aspects of the disclosure and as a non-limiting example, the electric axle drivetrain assembly may further include a second gear assembly. At least a portion of the first axle half shaft, opposite the differential assembly, may be connected to at least a portion of the second gear assembly and at least a portion of the second gear assembly, opposite the first axle half shaft, may be connected to at least a portion of the first wheel end assembly.

According to any one of the previous aspects of the disclosure and as a non-limiting example, the electric axle drivetrain assembly may further include a third gear assembly. At least a portion of the second axle half shaft, opposite the differential assembly, may be connected to at least a portion of the third gear assembly and at least a portion of the third gear assembly, opposite the second axle half shaft, may be connected to at least a portion of the second wheel end assembly.

According to any one of the previous aspects of the disclosure and as a non-limiting example, the first hub carrier portion may further include an axially outboard extending portion and the second hub carrier portion may further include axially outboard extending portion. At least a portion of a first leaf spring assembly may be connected to at least a portion of the axially outboard extending portion of the first hub carrier portion and at least a portion of a second leaf spring assembly may be connected to at least a portion of the axially outboard extending portion of the second hub carrier portion.

According to any one of the previous aspects of the disclosure and as a non-limiting example, the electric axle drivetrain assembly may further include one or more first trailing arms and/or one or more second trailing arms. At least a portion of a first end portion of the one or more first trailing arms may be connected to at least a portion of the first hub carrier portion and the second hub carrier portion. Additionally, at least a portion of a second end portion of the one or more first trailing arms may be connected to at least a portion of the chassis. Furthermore, at least a portion of a first end portion of the one or more second trailing arms may be connected to at least a portion of the support member and at least a portion of a second end portion of the one or more second trailing arms may be connected to at least a portion of the chassis.

According to any one of the previous aspects of the disclosure and as a non-limiting example, the one or more first trailing arms may extend axially inward an angle θ1 relative to a radial centerline of the one or more first trailing arms and the one or more second trailing arms may extend axially outward at an angle θ2 relative to a radial centerline of the one or more second trailing arms.

According to any one of the previous aspects of the disclosure and as a non-limiting example, the one or more first trailing arms and/or one or more second trailing arms may form a parallelogram trailing arm system.

According to any one of the previous aspects of the disclosure and as a non-limiting example, the angle θ2 of the one or more second trailing arms may be substantially equal to or greater than the angle θ1 of the one or more first trailing arms.

According to any one of the previous aspects of the disclosure and as a non-limiting example, the electric axle drivetrain assembly may further include a first joint assembly, a second joint assembly, a third joint assembly and/or a fourth joint assembly. At least a portion of the first axle half shaft may be connected to the differential by the first joint assembly and at least a portion of the first axle half shaft may be connected to the first wheel end assembly by the second joint assembly. Additionally, at least a portion of the second axle half shaft may be connected to the differential assembly by the third joint assembly and at least a portion of the second axle half shaft may be connected to at least a portion of the second wheel assembly by the fourth joint assembly.

According to any one of the previous aspects of the disclosure and as a non-limiting example, the electric axle drivetrain assembly may further include a first shaft having a first end portion and a second end portion. At least a portion of the first end portion of the first shaft may be drivingly connected to at least a portion of the motor and at least a portion of the second end portion of the first shaft may be connected to at least a portion of the first gear assembly.

According to any one of the previous aspects of the disclosure and as a non-limiting example, the electric axle drivetrain assembly may further include a fifth joint assembly and a sixth joint assembly. At least a portion of the first end portion of the first shaft may be connected to at least a portion of the fifth joint assembly which in turn is connected to at least a portion of the motor. Additionally, at least a portion of the second end portion of the first shaft may be connected to at least a portion of the sixth joint assembly which in turn is connected to at least a portion of the first gear assembly.

According to any one of the previous aspects of the disclosure and as a non-limiting example, the vehicle suspension system may be a De Dion suspension system.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the electric axle drivetrain assembly disclosed herein may be used in automotive, off-road vehicle, all-terrain vehicle, construction, structural, marine, aerospace, locomotive, military, machinery, robotic and/or consumer product applications. Additionally, as a non-limiting example, the electric axle drivetrain assembly disclosed herein may also be used in passenger vehicle, electric vehicle, hybrid vehicle, commercial vehicle, autonomous vehicles, semi-autonomous vehicles and/or heavy vehicle applications.

Figure 1:
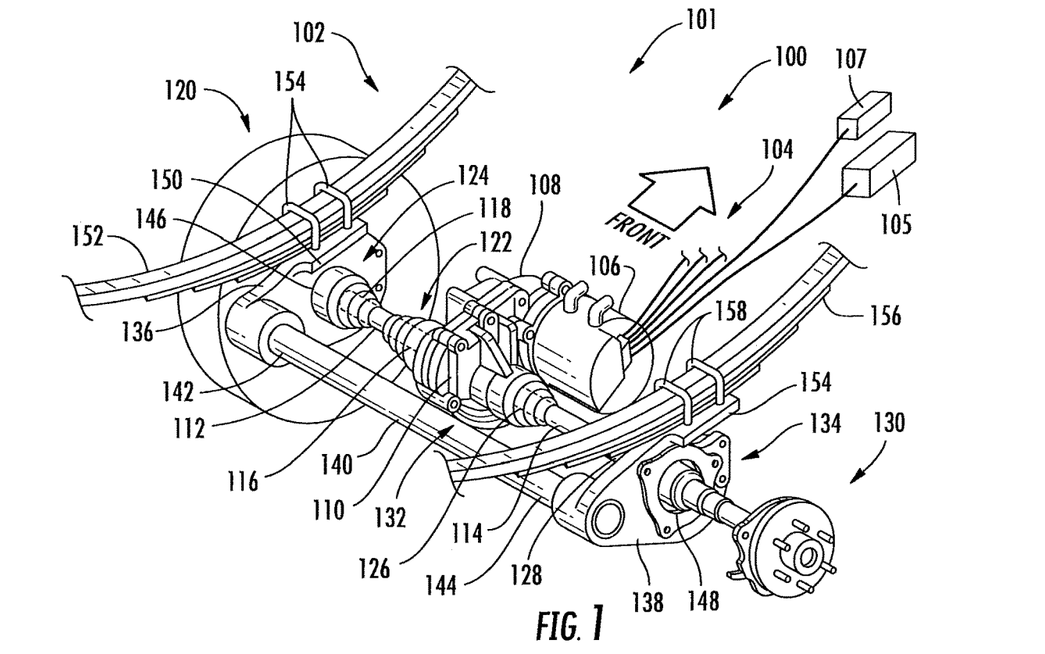
FIG. 1 is a schematic rearward perspective view of an electric axle drivetrain assembly according to an embodiment of the disclosure.
Figure 2:
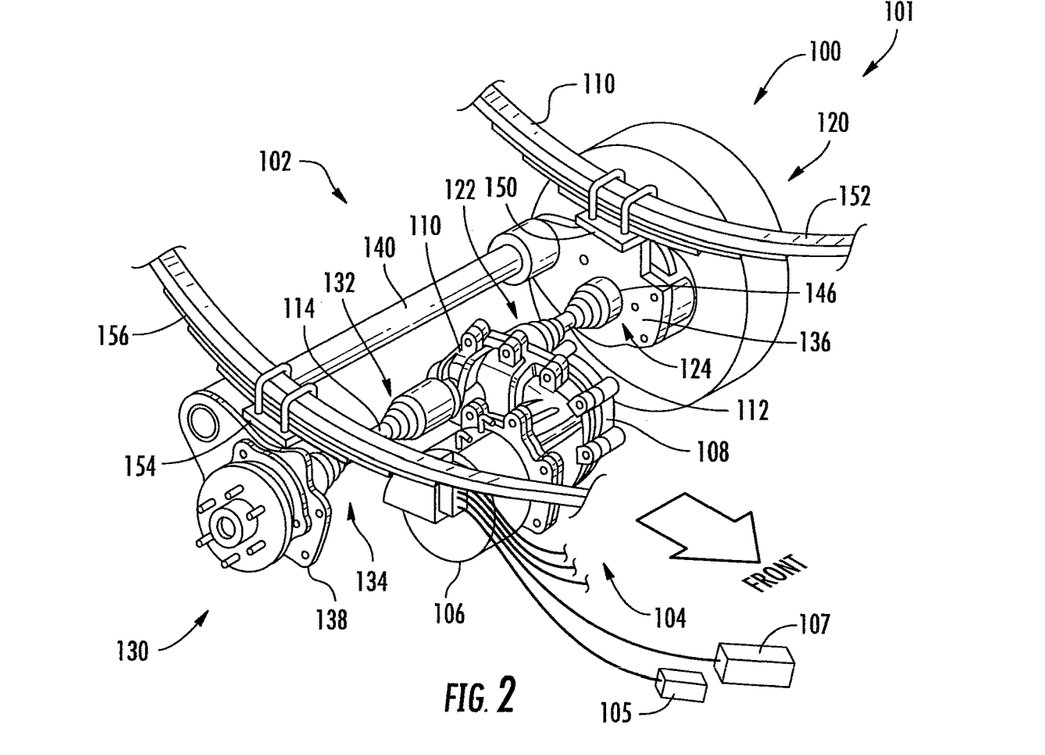
FIG. 2 is a schematic forward perspective view of the electric axle drivetrain assembly illustrated in FIG. 1 of the disclosure.

FIGS. 1 and 2 provide a schematic perspective illustration of an electric axle drivetrain assembly 100 of a vehicle 101 according to an embodiment of the disclosure. As illustrated in FIGS. 1 and 2 of the disclosure and as a non-limiting example, the electric axle drivetrain assembly 100 may include a vehicle suspension system 102 and an electric drive assembly 104. It is within the scope of this disclosure and as a non-limiting example that the vehicle suspension system 102 may be a De Dion type suspension system.

In accordance with the embodiment illustrated in FIGS. 1 and 2 of the disclosure and as a non-limiting example, the electric drive assembly 104 may include a motor 106 which is connected to at least a portion of a chassis (not shown) of the vehicle 101. At least a portion of the motor 106 may be connected to at least a portion of a power source 105 and a control unit assembly 107. The control unit assembly 107 may be configured in in order to instruct the motor 106 how much rotational power to generate, the direction of the rotational power generated, the activation of a power generation operation and/or the deactivation of a power generation operation. It is within the scope of this disclosure and as a non-limiting example that the motor 106 may be an electric motor or any other motor that is capable of converting an amount of electrical energy into an amount of mechanical energy. Additionally, it is within the scope of this disclosure and as a non-limiting example that the motor 106 of the electric drive assembly 104 may also function as a generator under certain pre-determined operating conditions to store generate and store an amount of electrical energy for later use. As a non-limiting example, the motor 106 may be connected to the chassis (not shown) of the vehicle by using one or more welds, one or more mechanical fasteners and/or one or more adhesives.

At least a portion of the motor 106 may be drivingly connected to at least a portion of a first gear assembly 108 which in turn may be drivingly connected to at least a portion of a differential assembly 110. The differential assembly 110 is a set of gears that allows the outer drive wheel(s) of the vehicle 101 to rotate at a faster rate than the inner drive wheel(s) of the vehicle 101. It is within the scope of this disclosure and as a non-limiting example that the first gear assembly 108 and/or the differential assembly 110 may be a reduction gear assembly that is capable of reducing the amount of rotational speed outputted by the motor 106 while increasing the overall amount of rotational torque outputted by the motor 106 of the vehicle 101. Additionally, it is within the scope of this disclosure and as a non-limiting example that at least a portion of the first gear assembly 108 and/or the differential assembly 110 may be connected to at least a portion of a chassis (not shown) of the vehicle 101. As a non-limiting example, the gear assembly 108 and/or the differential assembly 110 may be connected to the chassis (not shown) of the vehicle by using one or more welds, one or more mechanical fasteners and/or one or more adhesives.

The electric axle drivetrain assembly 100 may further include a first axle half shaft 112 and a second axle half shaft 114. At least a portion of a first end portion 116 of the first axle half shaft 112 may be drivingly connected to an end of the differential assembly 110 and at least a portion of a second end portion 118 of the first axle half shaft 112 may be drivingly connected to at least a portion of a first wheel end assembly 120. It is within the scope of this disclosure and as a non-limiting example that at least a portion of the first end portion 116 of the first axle half shaft 112 may be drivingly connected to at least a portion of a first joint assembly 122 which in turn is drivingly connected to the differential assembly 110 of the electric axle drivetrain assembly 100. Additionally, it is within the scope of this disclosure and as a non-limiting example that at least a portion of the second end portion 118 of the first axle half shaft 112 may be drivingly connected to at least a portion of the first wheel assembly 120 by using a second joint assembly 124. As a non-limiting example, the first and second joint assemblies 118 and 124 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

At least a portion of a first end portion 126 of the second axle half shaft 114 may be drivingly connected to at least a portion of an end of the differential assembly 110 opposite the first axle half shaft 112 of the electric axle drivetrain assembly 100. Additionally, at least a portion of a second end portion 128 of the second axle half shaft 114 may be drivingly connected to at least a portion of a second wheel end assembly 130. It is within the scope of this disclosure and as a non-limiting example that at least a portion of the first end portion 126 of the second axle half shaft 114 may be drivingly connected to at least a portion of a third joint assembly 132 which in turn is drivingly connected to the differential assembly 110 of the electric axle drivetrain assembly 100. Additionally, it is within the scope of this disclosure and as a non-limiting example that at least a portion of the second end portion 128 of the second axle half shaft 114 may be drivingly connected to at least a portion of the second wheel assembly 130 by using a fourth joint assembly 134. As a non-limiting example, the third and fourth joint assemblies 132 and 134 may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

As best seen in FIG. 1 of the disclosure and as a non-limiting example, the electric axle drivetrain assembly 100 may further include a first hub carrier portion 136, a second hub carrier portion 138 and a support member 140. At least a portion of the support member 140 may be axially and/or radially displaced from the first and second axle half shafts 112 and 114 of the electric axle drivetrain assembly 100. It is within the scope of this disclosure and as a non-limiting example that the support member 140 may be a beam, a solid shaft, a hollow tube, a partially hollow tube, a tube having a variable wall thickness, a tube made of a light weight composite material and/or a tube formed using one or more hydroforming processes.

Integrally connected to at least a portion of a first end portion 142 of the support member 140 is the first hub carrier portion 136 and integrally connected to at least a portion of a second end portion 144 of the support member 140 is the second hub carrier portion 138 of the electric axle drivetrain assembly 100. The support member 140 provides a rigid connection between the first and second hub carrier portions 138 and 138 of the electric axle drivetrain assembly 100. It is within the scope of this disclosure and as a non-limiting example that the first and second hub carrier portions 136 and 138 may be integrally connected to at least a portion of the support member 140 by using one or more welds, one or more mechanical fasteners, one or more adhesives and/or a threaded connection.

According to the embodiment illustrated in FIG. 1 of the disclosure and as a non-limiting example, at least a portion of the first axle half shaft 112, the second joint assembly 124 and/or the first wheel end assembly 120 may extend through a first hub carrier portion aperture 146 in the first hub carrier portion 136 of the electric axle drivetrain assembly 100. Additionally, according to an embodiment illustrated in FIG. 1 and as a non-limiting example, at least a portion of the second axle half shaft 114, the fourth joint assembly 134 and/or the second wheel end assembly 130 may extend through a second hub carrier portion aperture 148 in the second hub carrier portion 138 of the electric axle drivetrain assembly 100. It is within the scope of this disclosure and as a non-limiting example that at least a portion of the second joint assembly 124 may be connected to at least a portion of the first hub carrier portion 136 and at least a portion of the fourth joint member 134 may be connected to at least a portion of the second hub carrier portion 138 of the electric axle drivetrain assembly 100.

Extending outward from at least a portion of the first hub carrier portion 136 is a first hub carrier portion mounting flange 150. At least a portion of a first leaf spring assembly 152 may be connected to at least a portion of the first hub carrier portion mounting flange 150 of the electric axle drivetrain assembly 100. In accordance with the embodiment illustrated in FIGS. 1 and 2 of the disclosure and as a non-limiting example, at least a portion of the first leaf spring assembly 152 may be disposed radially outboard from at least a portion of the first axle half shaft 112, the second joint assembly 124 and/or the first wheel end assembly 120. As best seen in FIG. 1 and as a non-limiting example, at least a portion of the first leaf spring assembly 152 may be connected to at least a portion of the first hub carrier portion mounting flange 150 by using one or more first mechanical fasteners 154. It is therefore to be understood that the electric axle drivetrain assembly 100 may be an over slung leaf spring assembly.

At least a portion of a second hub carrier portion mounting flange 154 may extend outward from at least a portion of the second hub carrier portion 138 of the electric axle drivetrain assembly 100. A second leaf spring assembly 156 may be connected to at least a portion of the second hub carrier portion mounting flange 154. In accordance with the embodiment illustrated in FIGS. 1 and 2 of the disclosure and as a non-limiting example, at least a portion of the second leaf spring assembly 156 may be disposed radially outboard from at least a portion of the second axle half shaft 114, the fourth joint assembly 134 and/or the second wheel end assembly 130. As best seen in FIG. 1 of the disclosure and as a non-limiting example, at least a portion of the second leaf spring assembly 156 may be connected to at least a portion of the second hub carrier portion mounting flange 154 by using one or more second mechanical fasteners 158. It is therefore to be understood that the electric axle drivetrain assembly 100 may be an over slung leaf spring assembly. As a result, it is therefore to be understood that the motor 106, the first gear assembly 108, the differential assembly 110, the first axle half shaft, 112 and/or the second axle half shaft 114 may remain stationary with the chassis (not shown) of the vehicle 101 while the support member 140, the first and second hub carrier portions 136 and 138, the first and second wheel end assemblies 120 and 130 and/or the first and second leaf spring assemblies 152 and 154 move during rough or bumpy operating conditions.

Figure 3:
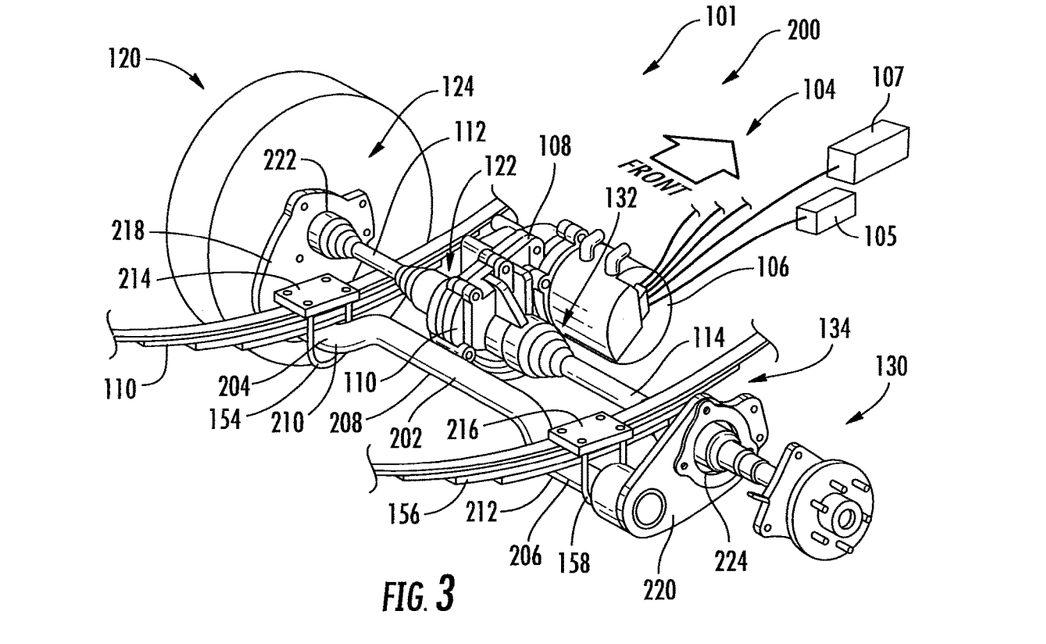
FIG. 3 is a schematic rearward perspective view of an electric axle drivetrain assembly according to an alternative embodiment of the disclosure.

FIG. 3 is a schematic rearward perspective view of an electric axle drivetrain assembly 200 of the vehicle 101 according to an alternative embodiment of the disclosure. The electric axle drivetrain assembly 200 illustrated in FIG. 3 is the same as the electric axle drivetrain assembly 100 illustrated in FIGS. 1 and 2, except where specifically noted below. As illustrated in FIG. 3 of the disclosure, the electric axle drivetrain assembly 200 does not include the support member 140, the first hub carrier portion 136, the second nub carrier portion 138, the first hub carrier portion mounting flange 150 and the second hub carrier portion mounting flange 154.

In accordance with the embodiment illustrated in FIG. 3 of the disclosure and as a non-limiting example, the electric axle drivetrain assembly 200 may include a support member 202 having a first end portion 204, a second end portion 206 and an intermediate portion interposed between the first and second end portions 204 and 206 of the support member 202. At least a portion of the support member 202 may be axially and/or radially displaced from the first and second axle half shafts 112 and 114 of the electric axle drivetrain assembly 200. It is within the scope of this disclosure and as a non-limiting example that the support member 202 may be a beam, a solid shaft, a hollow tube, a partially hollow tube, a tube having a variable wall thickness, a tube made of a light weight composite material and/or a tube formed using one or more hydroforming processes.

At least a portion of a first hub carrier portion 218 may be integrally to at least a portion of the first end portion 204 of the support member 202 and at least a portion of the second end portion 206 of the support portion 202 may be integrally connected to at least a portion of a second hub carrier portion 220. The support member 202 provides a rigid connection between the first and second hub carrier portions 138 and 138 of the electric axle drivetrain assembly 200. It is within the scope of this disclosure and as a non-limiting example that the first and second hub carrier portions 136 and 138 may be integrally connected to at least a portion of the support member 202 by using one or more welds, one or more mechanical fasteners, one or more adhesives and/or a threaded connection.

The first hub carrier portion 218 may include a first hub carrier portion aperture 222 and the second hub carrier portion 220 may include a second hub carrier portion aperture 224. According to the embodiment illustrated in FIG. 3 and as a non-limiting example, at least a portion of the first axle half shaft 112, the second joint assembly 124 and the first wheel end assembly 120 may extend through at least a portion of the first hub carrier portion aperture 222 in the first hub carrier portion aperture 222 of the electric axle drivetrain assembly 200. Additionally, in accordance with the embodiment illustrated in FIG. 3 and as a non-limiting example, at least a portion of the second axle half shaft 114, the fourth joint assembly 134 and/or the second wheel end assembly 130 may extend through at least a portion of the second hub carrier portion aperture 224 in the second hub carrier portion 220 of the electric axle drivetrain assembly 200.

As illustrated in FIG. 3 of the disclosure and as a non-limiting example, at least a portion of the first end portion 204 of the support member 202 may include a first radially inward extending portion 210. Additionally, as illustrated in FIG. 3, at least a portion of the second end portion 206 of the support member 202 may include a second radially inward extending portion 212. It is therefore to be understood that at least a portion of the intermediate portion 208 of the support member 202 may be disposed radially outboard from at least a portion of the first and second radially inward extending portions 210 and 212 of the support member 202.

Disposed radially outboard from at least a portion of the first radially inward extending portion 210 is the first leaf spring assembly 152 and disposed radially outboard from at least a portion of the second radially inward extending portion 212 is the second leaf spring assembly 156 of the electric axle drivetrain assembly 200. At least a portion of the first and second leaf spring assemblies 152 and 156 may be connected to at least a portion of the first and second radially inward extending portions 210 and 212 of the support member 202. In accordance with the embodiment illustrated in FIG. 3 of the disclosure and as a non-limiting example, at least a portion of the first leaf spring assembly 152 may be connected to at least a portion of the first radially inward extending portion 210 by using the one or more first mechanical fasteners 154 and a first plate member 214. Additionally, at least a portion of the second leaf spring assembly 156 may be connected to at least a portion of the second radially inward extending portion 212 by using the one or more second mechanical fasteners 158 and a second plate member 216. It is within the scope of this disclosure and as a non-limiting example that the first and second plate members 214 and 216, the one or more first and second mechanical fasteners 154 and 158 and the first and second leaf spring assemblies 152 and 156 may be disposed axially inboard from at least a portion of the first and second hub carrier portions 214 and 220 of the electric axle drivetrain assembly 200. As a result, it is therefore to be understood that the electric axle drivetrain assembly 200 may be an under slung leaf spring assembly.

Once the electric axle drivetrain assembly 200 has been assembled, at least a portion of the first and second leaf spring assemblies 152 and 156 may be disposed radially inboard from at least a portion of the first axle half shaft 112, the second axle half shaft 114, the second joint assembly 124, the fourth joint assembly 134, the first wheel end assembly 120 and/or the second wheel end assembly 130 of the electric axle drivetrain assembly 200.

Figure 4:
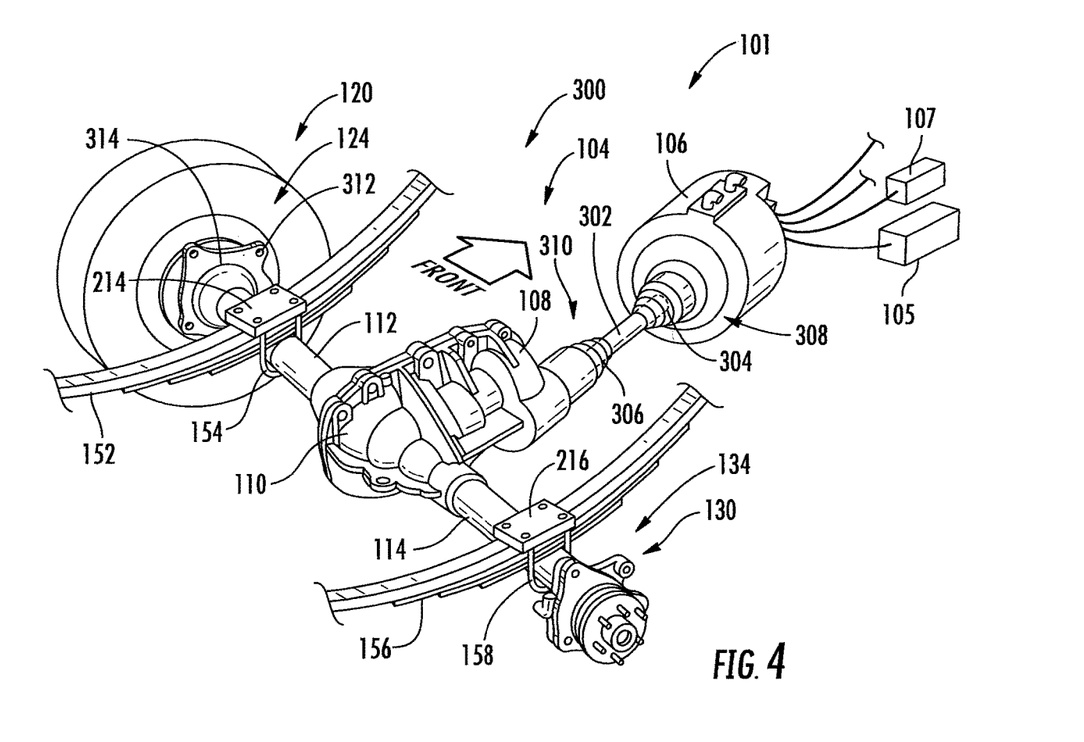
FIG. 4 is a schematic rearward perspective view of an electric axle drivetrain assembly according to an another embodiment of the disclosure.

FIG. 4 is a schematic rearward perspective view of an electric axle drivetrain assembly 300 of the vehicle 101 according to an another embodiment of the disclosure. The electric axle drivetrain assembly 300 illustrated in FIG. 4 is the same as the electric axle drivetrain assemblies 100 and 200 illustrated in FIGS. 1-3, except where specifically noted below. As best seen in FIG. 4 of the disclosure, the electric axle drivetrain assembly 300 does not include the support members 140 and 202, the second joint assembly 124 and the fourth joint assembly 134.

In accordance with the embodiment illustrated in FIG. 4 and as a non-limiting example, the electric drive assembly 104 of the electric axle drivetrain assembly 300 may include a first shaft 302 having a first end portion 304 and a second end portion 306. At least a portion of the first end portion 304 of the first shaft 302 may be drivingly connected to at least a portion of the motor 106 of the electric drive assembly 104. Additionally, at least a portion of the second end portion 306 of the first shaft 302 may be drivingly connected to at least a portion of the first gear assembly 108 of the of the electric drive assembly 104 of the electric axle drivetrain assembly 300. It is within the scope of this disclosure and as a non-limiting example that the first shaft 302 may be a drive shaft or a propeller shaft.

As best seen in FIG. 4 of the disclosure and as a non-limiting example, at least a portion of the first end portion 304 of the first shaft 302 may be drivingly connected to at least a portion of the motor 106 by a fifth joint assembly 308. Additionally, at least a portion of the second end portion 306 of the first shaft 302 may be drivingly connected to at least a portion of the first gear assembly 108 by a sixth joint assembly 310. It is within the scope of this disclosure and as a non-limiting example that the first and second joint assemblies may be a universal joint assembly, a U-joint assembly, a cardan joint assembly, a double cardan joint assembly, a Hooke's joint assembly, a Spicer joint assembly, a homokinetic joint assembly, a constant velocity joint assembly or a Hardy Spicer joint assembly.

According to the embodiment illustrated in FIG. 4 and as a non-limiting example, at least a portion of the first leaf spring assembly 152 may be disposed radially outboard from at least a portion of the first axle half shaft 112 and at least a portion of the second leaf spring assembly 156 may be disposed radially outboard from at least a portion of the second axle half shaft 114. At least a portion of the first and second leaf spring assemblies 152 and 156 may be secured to at least a portion of the first and second axle half shafts 112 and 114 by using the one or more first and second mechanical fasteners 154 and 158 and the first and second plate members 214 and 216. It is therefore to be understood that the electric axle drivetrain assembly 300 may be an under slung leaf spring assembly.

The electric axle drivetrain assembly 300 may further include a first hub carrier portion 312 and a second hub carrier portion (not shown). Extending through at least a portion of the first hub carrier portion 312 is a first hub carrier portion aperture 314 and extending through at least a portion of the second hub carrier portion (not shown) is a second hub carrier portion aperture (not shown). At least a portion of the second joint assembly 120, the first axle half shaft 112 and/or the first wheel end assembly 120 may extend through at least a portion of the first hub carrier portion aperture 314 in the first hub carrier portion 312. Additionally, at least a portion of the fourth joint assembly 134, the second axle half shaft 114 and/or the second wheel end assembly 130 may extend through at least a portion of the second hub carrier portion aperture (not shown) in the second hub carrier portion (not shown) of the electric axle drivetrain assembly 300.

In light of the foregoing, it is therefore to be understood that the motor 106, connected to at least a portion of the chassis (not shown) of the vehicle 101, may move relative to the first gear assembly 108, the differential assembly 110, the first axle half shaft 112, the second axle half shaft 114, the first leaf spring assembly 152, the second leaf spring assembly 156, the first wheel end assembly 120 and/or the second wheel end assembly 130. As a result, the unsprung portion of the vehicle 101 including the first gear assembly 108, the differential assembly 110, the first axle half shaft 112, the second axle half shaft 114, the first leaf spring assembly 152, the second leaf spring assembly 156, the first wheel end assembly 120 and/or the second wheel end assembly 130 may move relative to the motor 106 or the sprung portion of the vehicle 101.

Figure 5:
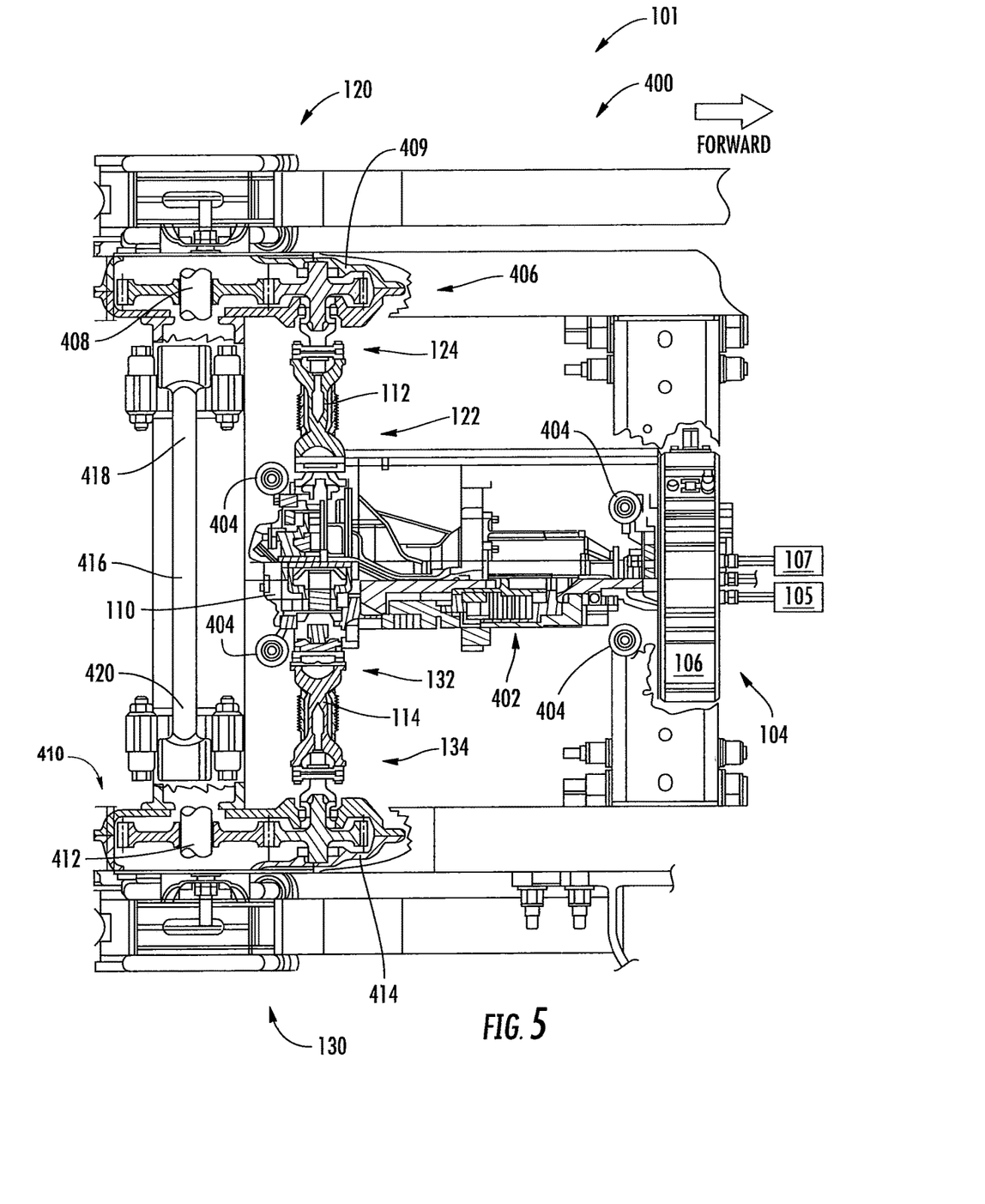
FIG. 5 is a partial cut-away schematic top-plan view of an electric axle drivetrain assembly according to yet another embodiment of the disclosure.

FIG. 5 is a partial cut-away schematic top-plan view of an electric axle drivetrain assembly 400 of the vehicle 101 according to yet another embodiment of the disclosure. The electric axle drivetrain assembly 400 illustrated in FIG. 5 is the same as the electric axle drivetrain assemblies 100, 200 and 300 illustrated in FIGS. 1-4, except where specifically noted below. As illustrated in FIG. 5 of the disclosure, the electric axle drivetrain assembly 400 does not include the support members 140 and 202 described and illustrated in relation to FIGS. 1-3 of the disclosure.

In accordance with the embodiment illustrated in FIG. 5 and as a non-limiting example, the electric axle drivetrain assembly 400 may further include a clutch assembly 402. As illustrated in FIG. 5 of the disclosure and as a non-limiting example, the clutch assembly 402 may be interposed between the motor 106 and the differential assembly 110 of the electric axle drivetrain assembly 400. It is therefore to be understood that the clutch assembly 402 may allow for a variable amount of torque to be distributed from the motor 106 to the differential assembly 110, to disconnect the motor 106 from the differential assembly 110 and/or to connect the motor 106 to the differential assembly 110. As a non-limiting example, the clutch assembly 402 may be a friction clutch assembly, a wet clutch assembly or a dog clutch assembly.

According to the embodiment illustrated in FIG. 5 of the disclosure and as a non-limiting example, at least a portion of the motor 106, the clutch assembly 402 and/or the differential assembly 110 may be connected to at least a portion of the chassis (not shown) of the vehicle 101. As illustrated in FIG. 5 and as a non-limiting example, the motor 106, clutch assembly 402 and/or the differential assembly 110 may be connected to at least a portion of the chassis (not shown) of the vehicle 101 by using one or more mount bushings 404. It is within the scope of this disclosure and as a non-limiting example that at least a portion of the one or more mount bushings 404 may be integrally formed as part of the housings of the motor 106, clutch assembly 402 and/or the differential assembly 110.

Drivingly connected to at least a portion of an end of the second joint assembly 124, opposite the first axle half shaft 112, is second gear assembly 406. As illustrated in FIG. 5 of the disclosure and as a non-limiting example, the second gear assembly 406 may include a second gear assembly output shaft 408 that is drivingly connected to at least a portion of the first wheel end assembly 120 so as to supply an amount of rotational power to the first wheel end assembly 120 needed to propel the vehicle 101. It is within the scope of this disclosure and as a non-limiting example that at least a portion of the second gear assembly 406 may be housed within at least a portion of a first hub carrier portion 409 of the electric axle drivetrain assembly 400. As a non-limiting example, the second gear assembly 406 may be a reduction gear assembly or a speed multiplier gear box where the rotational speed outputted by the second gear assembly 406 is greater than or less than the rotational speed inputted into the second gear assembly 406.

At least a portion of a third gear assembly 410 may be drivingly connected to at least a portion of the fourth joint assembly 134 opposite the second axle half shaft 114 of the electric axle drivetrain assembly 400. In accordance with the embodiment illustrated in FIG. 5 of the disclosure and as a non-limiting example, the third gear assembly 410 may include a third gear assembly output shaft 412 that is drivingly connected to at least a portion of the second wheel end assembly 130 so as to supply an amount of rotational power to the second wheel end assembly 130 needed to propel the vehicle 101. It is within the scope of this disclosure and as a non-limiting example that at least a portion of the third gear assembly 410 may be housed within at least a portion of a second hub carrier portion 414 of the electric axle drivetrain assembly 400. As a non-limiting example, the third gear assembly 410 may be a reduction gear assembly or a speed multiplier gear box where the rotational speed outputted by the third gear assembly 410 is greater than or less than the rotational speed inputted into the third gear assembly 410.

The electric axle drivetrain assembly 400 may further include a track rod 416 having a first end portion 416 and a second end portion 418. It is to be understood that the track rod 416 may aid in ensuring that the first and second wheel end assemblies 120 and 130 turn at the same angle when the vehicle 101 is in operation. As illustrated in FIG. 5 of the disclosure and as a non-limiting example, at least a portion of the first end portion 418 of the track rod 416 may be integrally connected to at least a portion of the first hub carrier portion 409 and at least a portion of the second end portion 420 of the track rod 416 may be integrally connected to at least a portion of the second hub carrier portion 414 of the electric axle drivetrain assembly 400. It is within the scope of this disclosure and as a non-limiting example that the first and second end portions 418 and 420 of the track rod 416 may be integrally connected to at least a portion of the first and second hub carrier portions 409 and 414 by using one or more welds, one or more mechanical fasteners, one or more adhesives and/or a threaded connection.

In light of the foregoing, it is therefore to be understood that the motor 106, clutch assembly 402 and the differential assembly 110, connected to at least a portion of the chassis (not shown) of the vehicle 101, may move relative to the second gear assembly 406, the third gear assembly 410, the first wheel end assembly 120 and/or the second wheel end assembly 130 of the electric axle drivetrain assembly 400. As a result, the unsprung portion of the vehicle 101 including the motor 106, the clutch assembly 402 and the differential assembly 110 may move relative to the second gear assembly 406, the third gear assembly 410, the first wheel end assembly 120 and/or the second wheel end assembly 130 (e.g. the sprung portion) of the vehicle 101.

Figure 6:
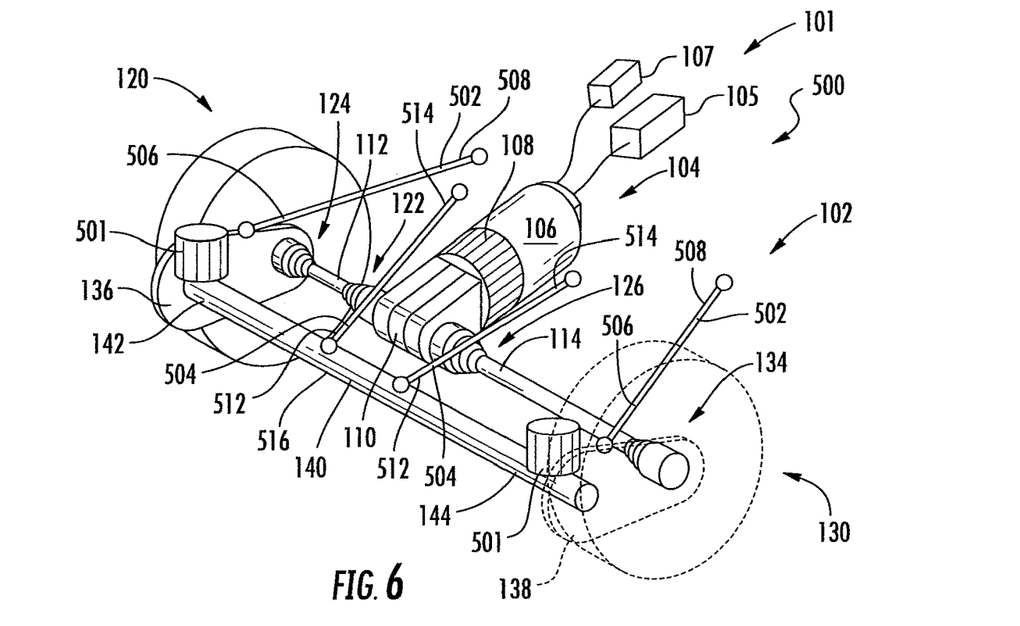
FIG. 6 is a schematic rearward perspective view of an electric axle drivetrain assembly according to yet a further embodiment of the disclosure.
Figure 6A:
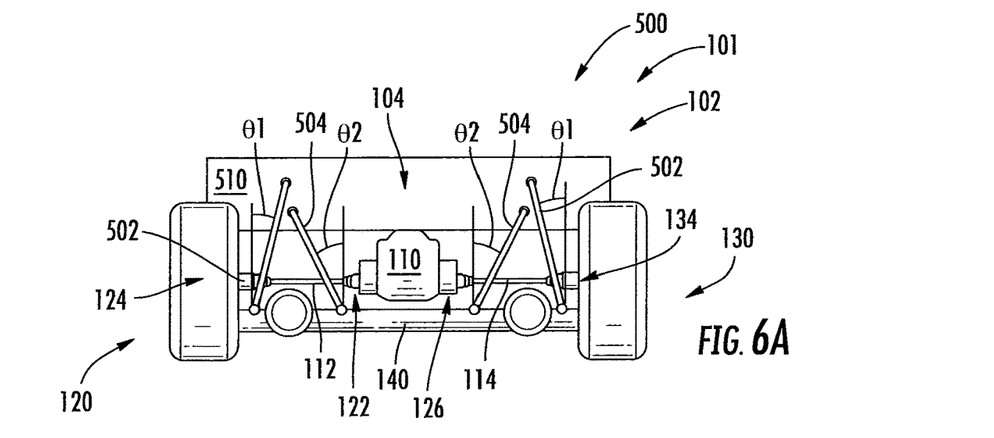
FIG. 6A is a schematic front-view of the electric axle drivetrain assembly illustrated in FIG. 6 of the disclosure.
Figure 6B:
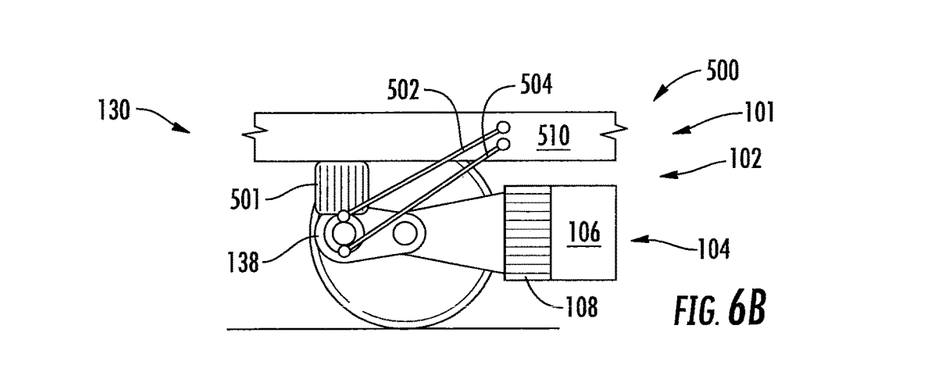
FIG. 6B is a schematic side-view of the electric axle drivetrain assembly illustrated in FIGS. 6 and 6A of the disclosure.

FIGS. 6-6B provide a schematic illustration of an electric axle drivetrain assembly 500 of the vehicle 101 according to yet a further embodiment of the disclosure. The electric axle drivetrain assembly 500 illustrated in FIGS. 6-6B is the same as the electric axle drivetrain assemblies 100, 200, 300 and 400 illustrated in FIGS. 1-5, except where specifically noted below. As illustrated in FIGS. 6-6B of the disclosure and as a non-limiting example, the electric axle drivetrain assembly 500 does not include the use of the second gear assembly 406, the third gear assembly 410 and/or the clutch assembly 402.

In accordance with the embodiment illustrated in FIGS. 6-6B of the disclosure and as a non-limiting example, the electric axle drivetrain assembly 500 may further include the use of one or more coil spring assemblies 501, one or more first trailing arms 502 and/or one or more second trailing arms 504. At least a portion of the one or more coil spring assemblies 501 may be connected to at least a portion of the first end portion 142 and/or the second end portion 144 of the support member 140 of the electric axle drivetrain assembly 500. Additionally, at least a portion of an end of the one or more coil assemblies 501 may be connected to at least a portion of a chassis 510 of the vehicle 101.

As illustrated in FIGS. 6-6B of the disclosure and as a non-limiting example, the one or more first trailing arms 502 have a first end portion 506 and a second end portion 508. At least a portion of the first end portion 506 of the one or more first trailing arms 502 may be connected to at least a portion of the first end portion 142 and/or the second end portion 144 of the support member 140 or the first hub carrier portion 136 of the electric axle drivetrain assembly 500. Additionally, at least a portion of the second end portion 508 of the one or more first trailing arms 502 may be connected to at least a portion of the chassis 510 of the vehicle 101 that is disposed radially outboard from at least a portion of the support member 140. It is within the scope of this disclosure and as a non-limiting example that the first end portion 506 of the one or more first trailing arms 502 may be pivotally connected to at least a portion of the support member 140 and at least a portion of the second end portion 508 of the one or more first trailing arms 502 may be pivotally connected to at least a portion of the chassis 510.

The one or more second trailing arms 504 have a first end portion 512 and a second end portion 514. At least a portion of the first end portion 512 of the one or more second trailing arms 504 may be connected to at least a portion of an intermediate portion 516 of the support member 140. As best seen in FIG. 6 of the disclosure and as a non-limiting example, the intermediate portion 516 of the support member 140 is interposed between the first and second end portions 142 and 144 of the support member 140. Additionally, in accordance with the embodiment illustrated in FIGS. 6-6B and as a non-limiting example, at least a portion of the second end portion 508 of the one or more second trailing arms 504 may be connected to at least a portion of the chassis 510 of the vehicle 101. In accordance with the embodiment illustrated in FIG. 6A of the disclosure and as a non-limiting example, the second end portion 514 of the one or more second trailing arms 504 may be connected to at least a portion of the chassis 510 at a location radially inboard from and/or axially off-set from the second end portion 508 of the one or more first trailing arms 502. It is within the scope of this disclosure and as a non-limiting example that the first end portion 512 of the one or more second trailing arms 504 may be pivotally connected to at least a portion of the support member 140 and at least a portion of the second end portion 514 of the one or more second trailing arms 504 may be pivotally connected to at least a portion of the chassis 510.

In accordance with the embodiment illustrated in FIG. 6A of the disclosure and as a non-limiting example, the one or more first trailing arms 502 of the electronic axle drivetrain assembly 500 may extend axially inward at an angle θ1 relative to a radial centerline of the one or more first trailing arms 502. It is within the scope of this disclosure and as a non-limiting example that the angle θ1, which the one or more first trailing arms 502 extend, may be substantially equal to one another or different from one another.

As best seen in FIG. 6A of the disclosure and as a non-limiting example, the one or more second trailing arms 504 of the electronic axle drivetrain assembly 500 may extend at an angle θ2 axially outward relative to a radial centerline of the one or more second trailing arms 504. It is within the scope of this disclosure and as a non-limiting example that the angle θ2, which the one or more second trailing arms 504 extend, may be substantially equal to one another of different from one another. Additionally, it is within the scope of this disclosure and as a non-limiting example, the angle θ2 of the one or more second trailing arms 504 may be substantially equal to or greater than the angle θ1 of the one or more first trailing arms 502.

In light of the foregoing, the vehicle suspension system 102 provides the vehicle 101 with an upper and/or lower links to the chassis 510 of the vehicle 101. It is to be understood that the vehicle suspension system 102 may be a parallelogram trailing arm system or a parallelogram four bar suspension system.

Figure 7:
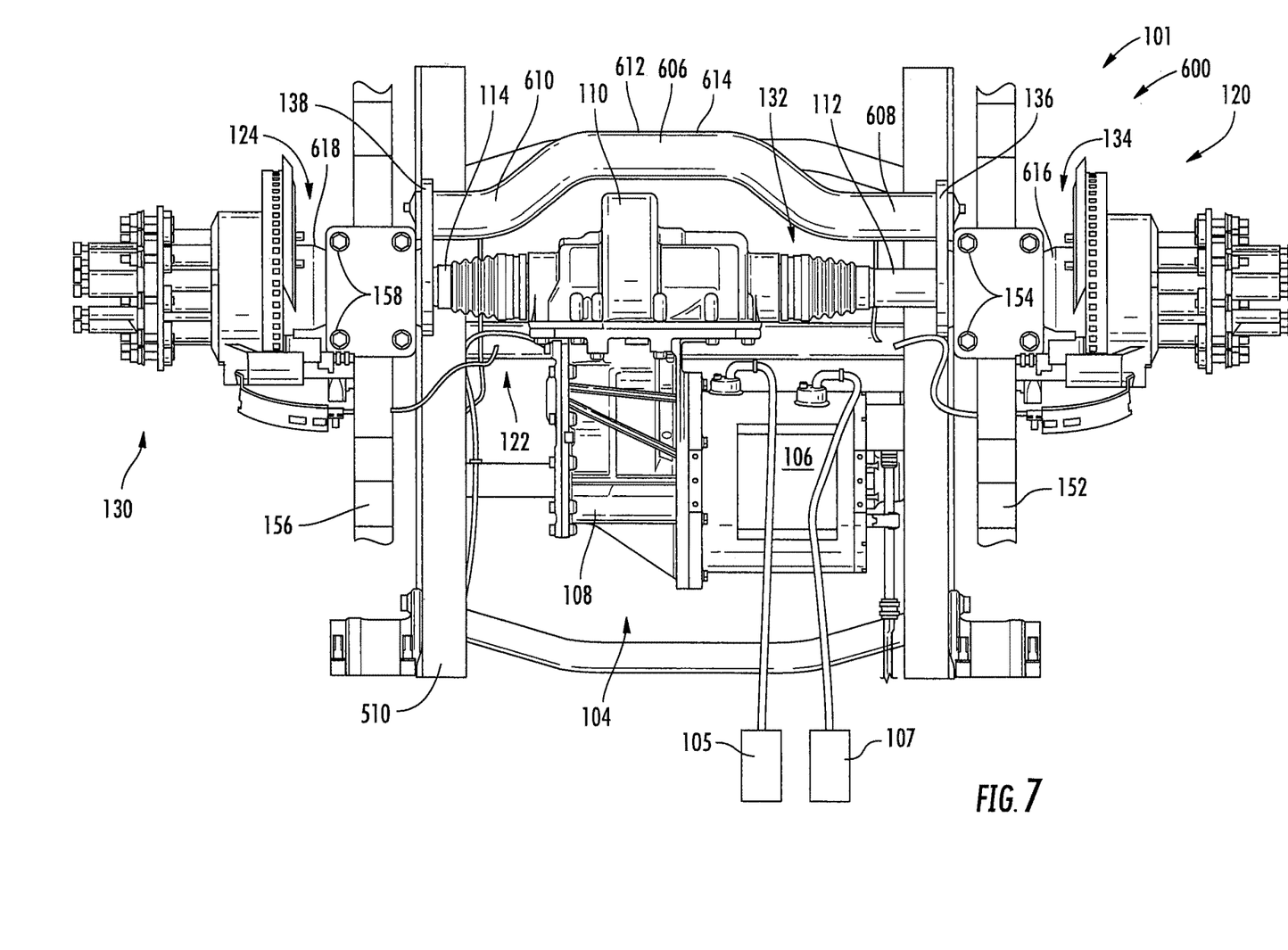
FIG. 7 is a schematic top-plan view of an electric axle drivetrain assembly according to still yet a further embodiment of the disclosure.
Figure 7A:
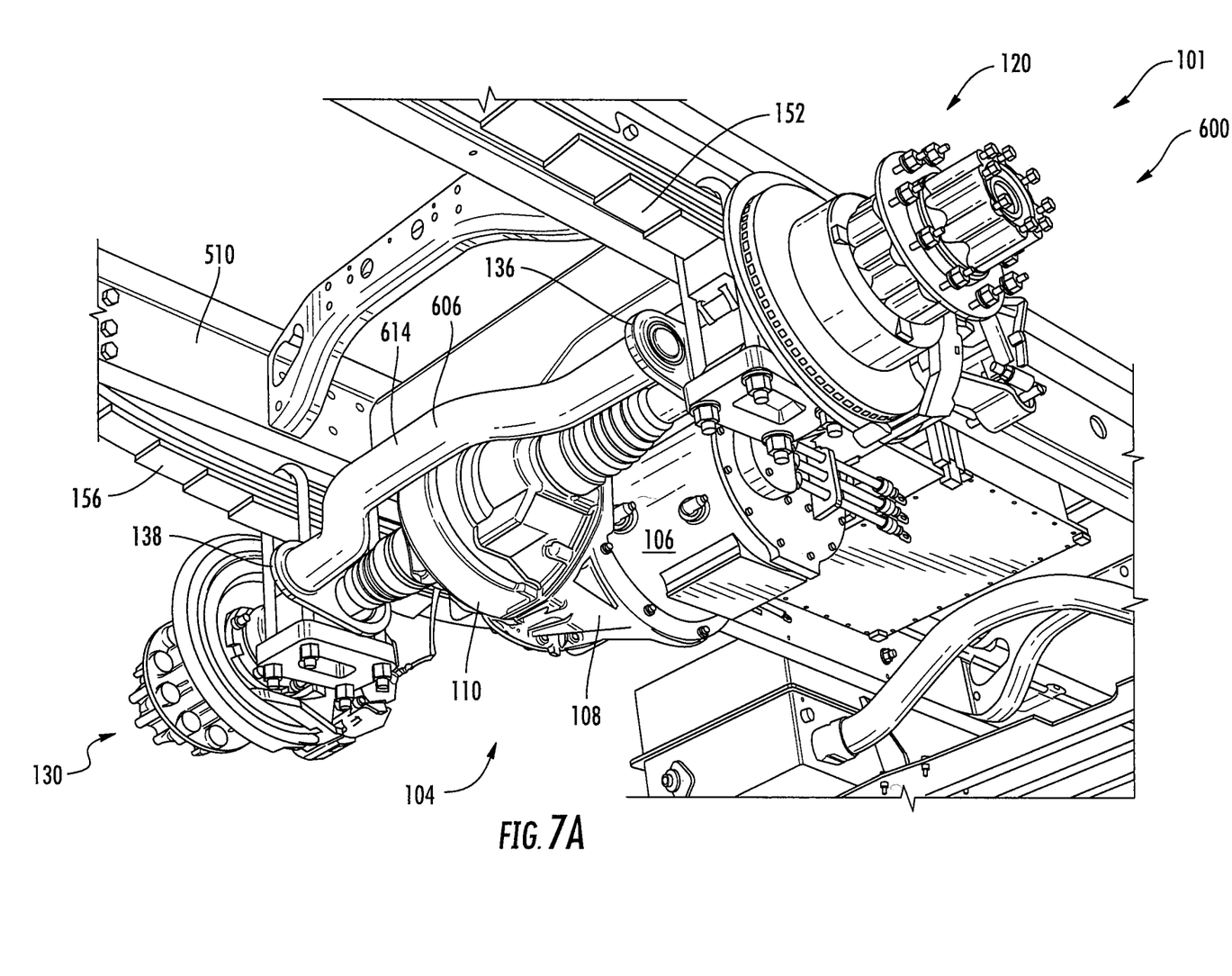
FIG. 7A is a schematic rearward perspective view of the electric axle drivetrain assembly illustrated in FIG. 7 of the disclosure.
Figure 7B:
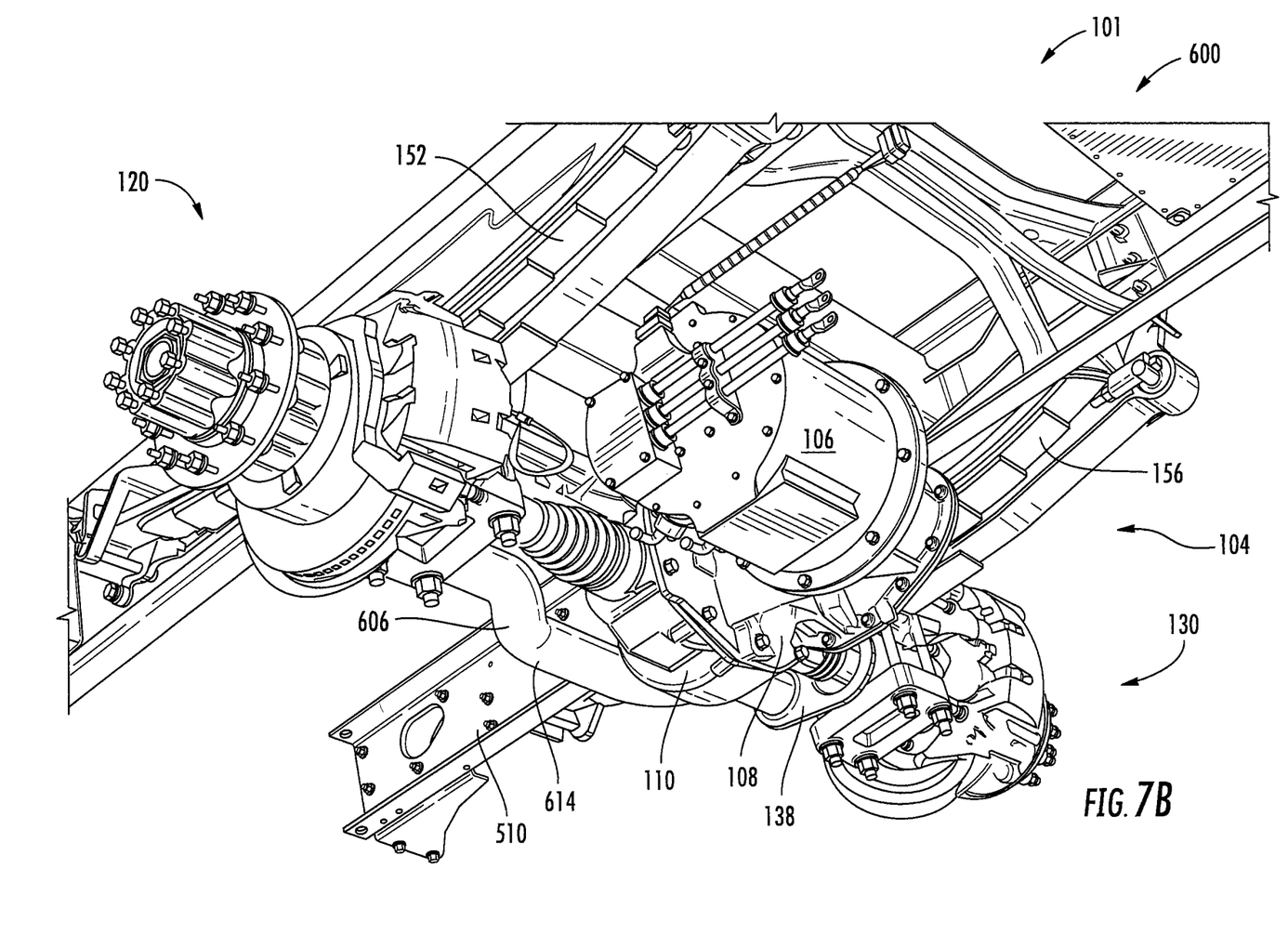
FIG. 7B is a schematic forward view of the electric axle drivetrain assembly illustrated in FIGS. 7 and 7A of the disclosure.

FIGS. 7-7B provide a schematic illustration of an electric axle drivetrain assembly 600 of the vehicle 101 according to still yet a further embodiment of the disclosure. The electric axle drivetrain assembly 600 illustrated in FIGS. 7-7B is the same as the electric axle drivetrain assemblies 100, 200, 300, 400 and 500 illustrated in FIGS. 1-6B, except where specifically noted below. As illustrated in FIGS. 7-7B of the disclosure and as a non-limiting example, the electric axle drivetrain assembly 600 does not include the support member 140 and 202 described and illustrated in relation to FIGS. 1, 2 and 3 of the disclosure.

Figure 7C:
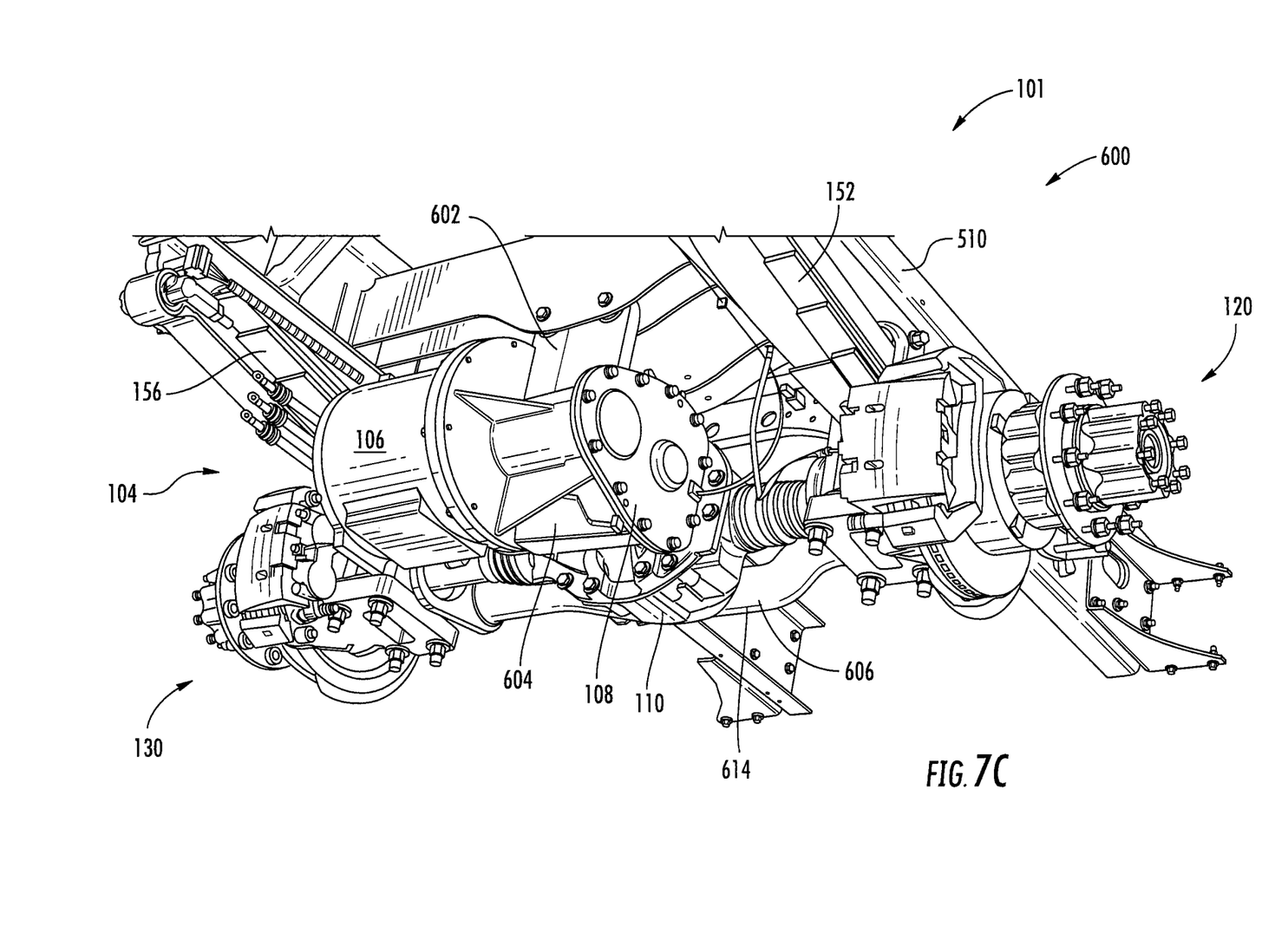
FIG. 7C is a schematic forward view of the electric axle drivetrain assembly illustrated in FIGS. 7 and 7A of the disclosure.

In accordance with the embodiment illustrated in FIG. 7C of the disclosure and as a non-limiting example, the first gear assembly 108 may further include a flange portion 602. At least a portion of the flange portion 602 may extend radially outboard from at least a portion of a housing 604 of the first gear assembly 108 toward the chassis 510 of the vehicle 101. As illustrated in FIG. 7C of the disclosure and as a non-limiting example, at least a portion of the flange portion 602 may be integrally connected to at least a portion of the chassis 510. According to an embodiment of the disclosure and as a non-limiting example, the flange portion 602 may be integrally formed as part of the housing 604 of the first gear assembly 108 or may be integrally connected to at least a portion of the housing 604. It is within the scope of this disclosure and as a non-limiting example, the flange portion 602 may be connected to at least a portion of the housing 604 of the first gear assembly 108 and the chassis 510 of the vehicle 101 by using one or more welds, one or more mechanical fasteners and/or on or more adhesives. In light of the foregoing, it is therefore to be understood that the motor 106, the first gear assembly 108, the differential assembly 110 may move relative to the first and second wheel end assemblies 120 and 130, a support member 606, the first leaf spring assembly 152 and the second leaf spring assembly 156 of the vehicle 101.

The support member 606 has a first end portion 608, a second end portion 610 and an intermediate portion 612 interposed between the first and second end portions 608 and 610 of the support member 606. At least a portion of the first end portion 608 of the support member 606 is connected to at least a portion of the first hub carrier portion 136 and at least a portion of the second end portion 610 of the support member 606 may be connected to at least a portion of the second hub carrier portion 138 of the electric axle drivetrain assembly 600. It is within the scope of this disclosure and as a non-limiting example that the first and second end portions 608 and 610 of the support member 606 may be connected to at least a portion of the first and second hub carrier portions 136 and 138 by using one or more mechanical fasteners, one or more welds, one or more adhesives and/or a threaded connection.

At least a portion of the intermediate portion 612 of the support member 606 may include an axially outward extending portion 614. The axially outward extending portion 614 of the support member 606 may be of a size and shape to receive at least a portion of the differential assembly 110 of the electric axle drivetrain assembly 600. This will allow the vehicle 101 to achieve reduced weight and improved packaging allowing the electric axle drivetrain assembly to be utilized in a wider array of vehicles.

As best seen in FIG. 7 of the disclosure and as a non-limiting example, at least a portion of the first leaf spring assembly 152 may be connected to at least a portion of an axially outboard extending portion 616 of the first hub carrier portion 136. Additionally, at least a portion of the second leaf spring assembly 156 may be connected to at least a portion of an axially outboard extending portion 618 of the second hub carrier portion 138 of the electric axle drivetrain assembly 600. In accordance with the embodiment illustrated in FIG. 7 and as a non-limiting example, the first and second leaf spring assemblies 152 and 156 may be disposed axially outboard from at least a portion of the first and second hub carrier portions 136 and 138. It is within the scope of this disclosure and as a non-limiting example that the first and second leaf spring assemblies 152 and 156 may be connected to at least a portion of the axially outward extending portions 616 and 618 of the first and second hub carrier portions 136 and 138 by using the one or more first and second mechanical fasteners 154 and 156. As a non-limiting example that the electric axle drivetrain assembly 600 may be an over slung leaf spring assembly.

In light of the foregoing, the electric axle drivetrain assemblies 100, 200, 300, 400, 500 and 600 of the vehicle 101 aid in reducing the overall unsprung mass or weight of the vehicle 101. This aids in creating a less harsh operating environment for the vehicle 101 in comparison to conventional axle mounted electric axle drivetrain assemblies.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed is:

1. An electric axle drivetrain assembly, comprising:
    a motor;
    a differential assembly drivingly connected to at least a portion of said motor;
    wherein a first axle half shaft is drivingly connected to at least a portion of an end of the differential assembly;
    wherein a second axle half shaft is drivingly connected to at least a portion of an end of the differential assembly opposite the first axle half shaft;
    wherein an end of the of the first axle half shaft opposite the differential assembly is drivingly connected to at least a portion of a first wheel end assembly;
    wherein an end of the second axle half shaft opposite the differential assembly is drivingly connected to at least a portion of a second wheel end assembly;
    a vehicle suspension system comprising a first hub carrier portion, a second hub carrier portion, and a support member;
    wherein said support member has a first end portion, a second end portion, and an intermediate portion interposed between said first and second end portions;
    wherein at least a portion of said first end portion of said support member is connected to at least a portion of the first hub carrier portion;
    wherein at least a portion of said second end portion of said support member is connected to at least a portion of the second hub carrier portion;
    a chassis; and
    a second gear assembly;
    wherein at least a portion of said first axle half shaft, opposite said differential assembly, is connected to at least a portion of said second gear assembly and at least a portion of said second gear assembly, opposite said first axle half shaft, is connected to at least a portion of said first wheel end assembly; and
    wherein at least a portion of said motor and/or said differential assembly are connected to at least a portion of said chassis.

2. The electric axle drive train assembly of claim 1, further comprising a first gear assembly; and
    wherein at least a portion of an end of said first gear assembly is drivingly connected to at least a portion of said motor and at least a portion of an end of said first gear assembly opposite said motor is drivingly connected to at least a portion of said differential assembly.

3. The electric axle drivetrain assembly according to claim 2, wherein said first gear assembly further comprises a flange portion extending radially outboard from at least a portion of a housing of the first gear assembly; and
    wherein at least a portion of said flange portion is connected to at least a portion of said chassis.

4. The electric axle drivetrain assembly according to claim 2, further comprising a first joint assembly, a second joint assembly, a third joint assembly, and a fourth joint assembly;
    wherein at least a portion of said first axle half shaft is connected to said differential assembly by said first joint assembly;
    wherein at least a portion of said first axle half shaft is connected to said first wheel end assembly by said second joint assembly;
    wherein at least a portion of said second axle half shaft is connected to said differential assembly by said third joint assembly; and
    wherein at least a portion of said second axle half shaft is connected to at least a portion of said second wheel end assembly by said fourth joint assembly.

5. The electric axle drivetrain assembly according to claim 2, further comprising a first shaft having a first end portion and a second end portion;
    wherein at least a portion of said first end portion of said first shaft is drivingly connected to at least a portion of said motor; and
    wherein at least a portion of said second end portion of said first shaft is connected to at least a portion of said first gear assembly.

6. The electric axle drivetrain assembly according to claim 5, further comprising a fifth joint assembly and a sixth joint assembly;
    wherein at least a portion of said first end portion of said first shaft is connected to at least a portion of said fifth joint assembly which in turn is connected to at least a portion of said motor; and
    wherein at least a portion of said second end portion of said first shaft is connected to at least a portion of said sixth joint assembly which in turn is connected to at least a portion of said first gear assembly.

7. The electric axle drivetrain assembly according to claim 1, further comprising a first leaf spring assembly and a second leaf spring assembly;

wherein at least a portion of said first leaf spring assembly is connected to at least a portion of a first hub carrier portion mounting flange; and wherein at least a portion of said second leaf spring assembly is connected to at least a portion of a second hub carrier portion mounting flange.

8. The electric axle drivetrain assembly according to claim 1, wherein said first hub carrier portion has a first hub carrier portion aperture and said second hub carrier portion has a second hub carrier portion aperture;

wherein at least a portion of said first axle half shaft and/or said first wheel end assembly extends through at least a portion of said first hub carrier portion aperture in said first hub carrier portion; and wherein at least a portion of said second axle half shaft and/or said second wheel end assembly extends through at least a portion of said second hub carrier portion aperture in said second hub carrier portion.

9. The electric axle drivetrain assembly according to claim 1, wherein said support member further comprises a first radially inward extending portion in at least a portion of said first end portion of said support member;

wherein at least a portion of said second end portion of said support member further comprises a second radially inward extending portion;

wherein at least a portion of a first leaf spring assembly is connected to at least a portion of said first radially inward extending portion of said support member; and wherein at least a portion of a second leaf spring assembly is connected to at least a portion of said second radially inward extending portion of said support member.

10. The electric axle drivetrain assembly according to claim 1, wherein said intermediate portion of said support member further includes an axially outward extending portion; and wherein said axially outward extending portion is of a size and shape to receive at least a portion of said differential assembly.

11. The electric axle drivetrain assembly according to claim 1, further comprising a clutch assembly; and wherein at least a portion of said clutch assembly is connected to said motor and at least another portion of said clutch assembly is connected to at least a portion of said differential assembly.

12. The electric axle drivetrain assembly according to claim 11, wherein said clutch assembly is a friction clutch assembly, a wet clutch assembly, or a dog clutch assembly.

13. The electric axle drivetrain assembly according to claim 1, wherein said first hub carrier portion further comprises a first axially outboard extending portion;

wherein said second hub carrier portion further comprises a second axially outboard extending portion;

wherein at least a portion of a first leaf spring assembly is connected to at least a portion of said first axially outboard extending portion of said first hub carrier portion; and wherein at least a portion of a second leaf spring assembly is connected to at least a portion of said second axially outboard extending portion of said second hub carrier portion.

14. The electric axle drivetrain assembly according to claim 1, wherein said vehicle suspension system is a De Dion suspension system.

15. An electric axle drivetrain assembly, comprising:
a motor;
a differential assembly drivingly connected to at least a portion of said motor;

wherein a first axle half shaft is drivingly connected to at least a portion of an end of the differential assembly;

wherein a second axle half shaft is drivingly connected to at least a portion of an end of the differential assembly opposite the first axle half shaft;

wherein an end of the of the first axle half shaft opposite the differential assembly is drivingly connected to at least a portion of a first wheel end assembly;

wherein an end of the second axle half shaft opposite the differential assembly is drivingly connected to at least a portion of a second wheel end assembly;

a vehicle suspension system comprising a first hub carrier portion, a second hub carrier portion, and a support member;

wherein said support member has a first end portion, a second end portion, and an intermediate portion interposed between said first and second end portions;

wherein at least a portion of said first end portion of said support member is connected to at least a portion of the first hub carrier portion;

wherein at least a portion of said second end portion of said support member is connected to at least a portion of the second hub carrier portion;

a chassis;

wherein at least a portion of said motor and/or said differential assembly are connected to at least a portion of said chassis; and a third gear assembly;

wherein at least a portion of said second axle half shaft, opposite said differential assembly, is connected to at least a portion of said third gear assembly and at least a portion of said third gear assembly, opposite said second axle half shaft, is connected to at least a portion of said second wheel end assembly.

16. An electric axle drivetrain assembly, comprising:
a motor;
a differential assembly drivingly connected to at least a portion of said motor;

wherein a first axle half shaft is drivingly connected to at least a portion of an end of the differential assembly;

wherein a second axle half shaft is drivingly connected to at least a portion of an end of the differential assembly opposite the first axle half shaft;

wherein an end of the of the first axle half shaft opposite the differential assembly is drivingly connected to at least a portion of a first wheel end assembly;

wherein an end of the second axle half shaft opposite the differential assembly is drivingly connected to at least a portion of a second wheel end assembly;

a vehicle suspension system comprising a first hub carrier portion, a second hub carrier portion, and a support member;

wherein said support member has a first end portion, a second end portion, and an intermediate portion interposed between said first and second end portions;

wherein at least a portion of said first end portion of said support member is connected to at least a portion of the first hub carrier portion;

wherein at least a portion of said second end portion of said support member is connected to at least a portion of the second hub carrier portion;

a chassis;

wherein at least a portion of said motor and/or said differential assembly are connected to at least a portion of said chassis; and one or more first trailing arms and/or one or more second trailing arms;

wherein at least a portion of a first end portion of said one or more first trailing arms are connected to at least a portion of said first hub carrier portion and said second hub carrier portion;

wherein at least a portion of a second end portion of said one or more first trailing arms are connected to at least a portion of said chassis;

wherein at least a portion of a first end portion of said one or more second trailing arms are connected to at least a portion of said support member; and wherein at least a portion of a second end portion of said one or more second trailing arms are connected to at least a portion of said chassis.

17. The electric axle drivetrain assembly according to claim 16, wherein said one or more first trailing arms extend axially inward at an angle θ1 relative to a radial centerline of said one or more first trailing arms; and wherein said one or more second trailing arms extend axially outward at an angle θ2 relative to a radial centerline of said one or more second trailing arms.

18. The electric axle drivetrain assembly according to claim 17, wherein said angle θ2 of said one or more second trailing arms is substantially equal to or greater than said angle θ1 of said one or more first trailing arms.

19. The electric axle drivetrain assembly according to claim 16, wherein said one or more first trailing arms and/or said one or more second trailing arms form a trailing arm system, wherein said one or more first trailing arms and said one or more second trailing arms are of equal length.

* * * * *